United States Patent [19]
Douglas et al.

[11] Patent Number: 5,606,516
[45] Date of Patent: Feb. 25, 1997

[54] DIGITALLY COMPENSATED HYDRAULIC SCALE SYSTEM

[75] Inventors: Alec T. Douglas; Harry J. Keen, both of St. Johnsbury, Vt.

[73] Assignee: Fairbanks Scales Inc., Kansas City, Mo.

[21] Appl. No.: 511,732

[22] Filed: Aug. 7, 1995

[51] Int. Cl.$^6$ .............................. G01G 5/04; G01L 19/04
[52] U.S. Cl. ........................ 364/571.04; 177/50; 177/208; 177/211; 177/254; 73/4 R; 73/708
[58] Field of Search ................................. 177/25.14, 211, 177/50, 51, 208, 254; 73/4, 708, 141; 364/571.04

[56] References Cited

U.S. PATENT DOCUMENTS

| | | |
|---|---|---|
| 2,291,027 | 7/1942 | Cole . |
| 3,178,937 | 4/1965 | Bradley . |
| 3,621,928 | 11/1971 | Sprague . |
| 3,633,695 | 1/1972 | Bradley . |
| 3,637,034 | 1/1972 | Wickenberg . |

(List continued on next page.)

FOREIGN PATENT DOCUMENTS

| | | |
|---|---|---|
| 72907/37 | 11/1987 | Australia . |
| 340902 | 11/1919 | Germany . |
| 1462808 | 1/1977 | United Kingdom . |
| 1462802 | 1/1977 | United Kingdom . |
| 2065895 | 1/1981 | United Kingdom . |
| 2191001 | 12/1987 | United Kingdom . |

OTHER PUBLICATIONS

"Handbood of Transducers for Electronic Measuring Systems", Chapter 10; Norton, Harry N., Prentic Hall, Inc. (1969).
Sensotec, Portions of 1995/1996 Catalog.
"Computer–aided Measurement"; Brignell, J. E. and Young, R; J. Phys. E: Sci. Instrum., vol. 12, 1979.
"Sensors for Microprocessor–based Applications"; Brignell, J. E. and Dorey, A. P.; J. Phys. E: Sci. Instrum., vol. 16, 1983.
"Software Techniques for Sensor Compensation"; Brignell, J. E.; Sensors and Actuators A. 25–27 (1991) 29–35.
"Counting Banknotes by Weight: An Exercise in Transducer Compensation Techniques"; Soutoudeh, A., J. E. Brignell Associates Ltd. and Brignell, J. E.; Weightech '83.
"Transducer Compensation in Digital Instruments: 'Intelligent' Transducers"; Sotoudeh Abbas; A thesis presented for the degree of Doctor of Philosophy of the University of Southampton, Nov. 1985.

(List continued on next page.)

*Primary Examiner*—Emauel T. Voeltz
*Assistant Examiner*—Demetra R. Smith
*Attorney, Agent, or Firm*—David M. Klein; Bryan Cave LLP

[57] ABSTRACT

A pressure transducer module includes a plurality of cavities, each cavity in fluid communication with a hydraulic load cell. Each cavity deforms with variations in the pressure of the hydraulic fluid in the cavity. Sensors generate output signals representative of the deformation of the cavities. The sensor output signals are digitized and multiplexed, whereby the transducer module generates a digital output data stream. The pressure transducer module is pre-calibrated for creep, hysteresis, non-linearity and temperature related errors. A computer controller stores the calibration data for the module. The pressure transducer module also includes a temperature sensor. A weighing system includes a weighing platform or structure; at least one pressure transducer module; and hydraulic transducers for measuring the load applied to the weighing platform or structure. A controller receives the outputs of the sensors and applies the calibration data to calculate the weight of the load on the platform. The transducer module may be used in weighing systems having different load ranges. Also provided is a method and apparatus for pre-calibrating the pressure transducer module, a method and apparatus for pre-calibrating the hydraulic transducers, and a method of performing cornering correction in a weighing system. In an alternative embodiment, the pressure transducer module may include a microprocessor and calibration data memory so as to perform error compensation on the pressure transducer module within the module itself.

52 Claims, 9 Drawing Sheets

U.S. PATENT DOCUMENTS

| | | |
|---|---|---|
| 3,646,854 | 3/1972 | Bradley et al. . |
| 3,658,142 | 4/1972 | Marshall et al. . |
| 3,658,143 | 4/1972 | Schwartz . |
| 3,665,169 | 5/1972 | Henderson et al. . |
| 3,666,032 | 5/1972 | Maffia et al. . |
| 3,765,497 | 10/1973 | Thordarson . |
| 3,774,704 | 11/1973 | Purcell . |
| 3,780,818 | 12/1973 | Lumby et al. . |
| 3,787,030 | 1/1974 | Bieker . |
| 3,813,789 | 6/1974 | Shelton . |
| 3,831,687 | 8/1974 | Maffia et al. . |
| 3,866,464 | 2/1975 | Franklin . |
| 3,876,017 | 4/1975 | Ziefle . |
| 3,889,529 | 6/1975 | Bradley . |
| 3,916,173 | 10/1975 | Williams, Jr. et al. . |
| 3,962,569 | 6/1976 | Loshbough et al. . |
| 3,986,012 | 10/1976 | Loshbough et al. . |
| 3,992,946 | 11/1976 | Bradley . |
| 3,999,427 | 12/1976 | Decker et al. . |
| 4,004,139 | 1/1977 | Hall . |
| 4,005,606 | 2/1977 | Mummery et al. . |
| 4,009,604 | 3/1977 | Taber et al. . |
| 4,033,210 | 7/1977 | Swenson . |
| 4,043,412 | 8/1977 | Rock . |
| 4,049,069 | 9/1977 | Tamamura et al. . |
| 4,056,156 | 11/1977 | Dayton . |
| 4,064,955 | 12/1977 | Dyck . |
| 4,078,624 | 3/1978 | Bradley . |
| 4,081,988 | 4/1978 | Change et al. ............................... 73/4 |
| 4,106,580 | 8/1978 | DeMasters et al. . |
| 4,137,977 | 2/1979 | Alger . |
| 4,161,117 | 7/1979 | Decker et al. . |
| 4,219,090 | 8/1980 | Dayton . |
| 4,261,195 | 4/1981 | Lockery . |
| 4,261,428 | 4/1981 | Bradley . |
| 4,261,429 | 4/1981 | Lockery ............................... 177/211 |
| 4,285,126 | 8/1981 | Irwin . |
| 4,360,071 | 11/1982 | Dyck . |
| 4,366,876 | 1/1983 | Chen . |
| 4,368,792 | 1/1983 | Ottle . |
| 4,383,584 | 5/1983 | Dyck . |
| 4,401,173 | 8/1983 | Komoto . |
| 4,416,342 | 11/1983 | Snead . |
| 4,440,250 | 6/1984 | Sigg . |
| 4,456,084 | 6/1984 | Miller . |
| 4,465,211 | 8/1984 | van der Lely et al. . |
| 4,491,027 | 1/1985 | Yalof et al. . |
| 4,491,190 | 1/1985 | Mayfield . |
| 4,502,555 | 3/1985 | Gower . |
| 4,535,854 | 8/1985 | Gard et al. . |
| 4,537,266 | 8/1985 | Greenberg . |
| 4,556,115 | 12/1985 | Lockery et al. . |
| 4,574,899 | 3/1986 | Griffen . |
| 4,583,606 | 4/1986 | Menon . |
| 4,606,419 | 8/1986 | Perini . |
| 4,620,436 | 11/1986 | Hirabayashi et al. . |
| 4,660,662 | 4/1987 | Katz . |
| 4,691,290 | 9/1987 | Griffen . |
| 4,703,815 | 11/1987 | Hirano et al. . |
| 4,716,979 | 1/1988 | Bradley et al. . |
| 4,738,324 | 4/1988 | Borchard . |
| 4,759,493 | 7/1988 | Bradley et al. . |
| 4,792,003 | 12/1988 | Hirano et al. . |
| 4,792,004 | 12/1988 | Sheffield . |
| 4,792,005 | 12/1988 | Olzog . |
| 4,799,558 | 1/1989 | Griffen . |
| 4,804,052 | 2/1989 | Griffen . |
| 4,815,313 | 3/1989 | Beard ............................... 73/4 |
| 4,815,547 | 3/1989 | Dillon et al. . |
| 4,836,308 | 6/1989 | Davis et al. . |
| 4,845,649 | 7/1989 | Eckhardt et al. . |
| 4,909,338 | 3/1990 | Vitunic et al. . |
| 4,914,611 | 4/1990 | Yamanaka et al. . |
| 4,967,384 | 10/1990 | Molinar et al. . |
| 4,981,187 | 1/1991 | Masuyama et al. . |
| 5,004,058 | 4/1991 | Langford et al. . |
| 5,076,375 | 12/1991 | Dillon et al. . |
| 5,076,449 | 12/1991 | Clutter . |
| 5,113,350 | 5/1992 | Sargent . |
| 5,117,373 | 5/1992 | Huff . |
| 5,133,421 | 7/1992 | Wang . |
| 5,170,856 | 12/1992 | Yang . |
| 5,224,388 | 7/1993 | Pratt . |
| 5,257,668 | 11/1993 | Sargent et al. . |
| 5,276,432 | 1/1994 | Travis . |
| 5,285,020 | 2/1994 | Jurca . |
| 5,287,748 | 2/1994 | Talmadge . |
| 5,294,756 | 3/1994 | Lauber et al. . |
| 5,296,655 | 3/1994 | Sargent et al. . |

OTHER PUBLICATIONS

"Measurement uncertainty in Assessment of Weight and Centre of Gravity Position of Large (Offshore) Modules, using Strain Gauge Load Cells"; Tegelaar, P.; Institute of Mechanical Constructions (Nederlands) Mar. 1983.

"A Portable Electronic Scale For Weighby Vehicles In Motion"; Lee, Clyde E., Al–Rashid, Nasser I.; Center For Highway Research, The University of Texas At Austin, Apr. 1968.

BLEED PORT
OUTPUT CONNECTION 14

FLOOR SCALE DECK
HYDRAULIC FLUID 7
ROLLING RUBBER DIAPHRAM 10
BASE CYLINDER
PISTON
RUBBER PAD 9

DIGITALLY COMPENSATED HYDRAULIC SCALE SYSTEM

BACKGROUND OF THE INVENTION

1. Field of the Invention

The present invention relates generally to a weighing system which incorporates hydraulic load cells, and more particularly to a hydraulic weighing system which includes a digitally compensated pressure transducer module so as to provide a more cost-effective, accurate, hydraulic weighing system.

2. Description of the Related Art

Weighing systems which incorporate hydraulic load cells are well-known in the art. A typical hydraulic load cell includes a piston which is mounted in a cylinder. The hydraulic load cell is mounted to a weighing platform such that the force applied to the weighing platform is transmitted to the piston, thereby compressing hydraulic fluid in the cylinder. Examples of hydraulic load cells are shown for example, in U.S. Pat. Nos. 3,658,143; 3,633,695; 3,646,854; 3,658,142; 4,360,071; 3,999,427; 3,889,529; 4,383,584; and 3,765,497.

One technique for measuring the load on the hydraulic load cell is to measure the pressure of the hydraulic fluid. An overview of a number of types of pressure transducers is provided in "Handbook of Transducers for Electronic Measuring Systems—Chapter 10, " H Norton, Prentice Hall, Inc. (1969). As for measuring the total weight on a weighing platform, Bradley, U.S. Pat. No. 3,992,946, relates to a weighing apparatus which comprises a plurality of load cells, each including a piston, a cylinder and a flexible diaphragm. The cylinders are interconnected in spaced coaxial relation on a support frame. An output signal is generated which combines the total output pressures of the independent hydraulic load cells.

Miller, U.S. Pat. No. 4,456,084 relates to a system for monitoring the load carried by a vehicle. A plurality of load cells extend between a load bed and the unsprung portion of the vehicle suspension. Each load cell includes a hydraulic cylinder which generates a hydraulic force corresponding to the load applied thereto. A pressure transducer is connected to each hydraulic cylinder, and the outputs of the transducers are summed and fed to an auto-zeroing system. The output of this system is connected to A\D converter and then to a visual display.

Huff, U.S. Pat. No. 5,117,373 relates to a weighing system that includes a hydraulic cell with an analog pressure transducer. The output of the pressure transducer is coupled with an A/D converter to convert the analog signal to a digital signal. The weight is conditioned by utilizing pressure and temperature amplification, which allow the container to be zeroed and scaled to monitor the weight.

Davis et al., U.S. Pat. No. 4,836,308, relates to a weighing system that includes hydraulic load cells and pressure transducers to generate an analog signal having an amplitude proportional to the weight on the load cells. A conversion device converts the analog signal into an oscillation signal having a frequency which is proportional to the weight on the platform. A counter couples to the conversion device to monitor the oscillation signal and to provide a monitored load count which is proportional to the weight. A computer converts the load count into a signal representative of the weight.

It is desirable to have a weighing system that provides the benefits of the use of multiple hydraulic load cells and which i) is relatively inexpensive to manufacture as compared to conventional strain gauge load cells; ii) is modular with components that may be used in weighing systems having different load ranges; and iii) provides digital compensation for errors in the system components so as to provide the accuracy required of a commercial scale. None of the aforementioned devices provides each of these benefits.

SUMMARY OF THE INVENTION

The present invention is a pressure transducer module which includes a plurality of cavities, with each cavity in fluid communication with an associated source of pressurized hydraulic fluid, preferably a hydraulic load cell. Each cavity includes a diaphragm plate that deforms generally proportionately to variations in the pressure of the hydraulic fluid in the cavity. A sensor mounted to the diaphragm near each cavity generates an output signal representative of the deformation of the diaphragm plate.

In a preferred embodiment, the pressure transducer module includes a base plate, with the diaphragm plate fixedly attached to the base plate, with the cavities formed in either the base plate or the diaphragm plate. Each sensor, which is preferably a strain gauge arranged in a wheatstone bridge, is located adjacent to its associated cavity on the other side of the diaphragm plate from the cavity.

The output signals from the sensors are multiplexed and converted to digital form, whereby the pressure transducer module generates a digital output signal comprising the outputs of the sensors. The pressure transducer module is pre-calibrated, and a computer controller stores calibration data for the module. The pre-calibration data includes data for compensating for creep, hysteresis, non-linearity and temperature properties of the pressure transducer module. The pressure transducer module also includes a temperature sensor for measuring the average temperature of the transducer module.

A modular weighing system includes a weighing platform; at least one pressure transducer module; and a plurality of hydraulic transducers positioned for measuring the load applied to the weighing platform. Each hydraulic transducer generates a hydraulic fluid output at a pressure proportional to the load applied to the hydraulic transducer. Each hydraulic transducer output is connected to an associated cavity of the pressure transducer module. A controller receives the outputs of the sensors and applies the aforementioned calibration data to the outputs of the sensors to calculate the weight of the load on the platform.

Each hydraulic transducer output preferably has a fixed pre-determined output pressure range corresponding to the load range for that hydraulic transducer, so that the controller may scale the hydraulic fluid pressure input against the pre-determined output pressure range of its associated hydraulic transducer for determining the load on each hydraulic transducer. Thus, the transducer module may be used in weighing systems having different load ranges.

The calibration data is generated by: applying a varying pressure input to the pressure transducer module; generating an accurate pressure reference signal for measuring the varying pressure; computing calibration data for the pressure transducer utilizing the pressure reference signal and the pressure transducer pressure output signals; and storing the calibration data on storage means associated with the pressure transducer module, preferably a bar-code label.

If temperature compensation is to be provided, the calibration data is generated by the following further steps:

applying a varying temperature to the pressure transducer module while varying the pressure on the pressure transducer module; generating an accurate reference signal for measuring the varying temperature; and computing the calibration data for the pressure transducer module utilizing the temperature reference signal, the pressure reference signal and the pressure transducer output signals.

A system for performing calibration includes a calibration chamber in which a varying pressure is applied to the pressure transducer module at a varying temperature. The calibration system comprises: a calibration controller for the varying the pressure and temperature, means for generating an accurate reference signal for measuring the varying pressure, and means for generating an accurate reference signal for measuring the varying temperature. The calibration controller further comprises means for reading the pressure reference signal, the temperature reference signal and the pressure transducer output signals, means for computing the calibration data for the pressure transducer module utilizing the temperature reference signal, the pressure reference signal and the pressure transducer output signals, and means for storing the calibration data on means associated with the pressure transducer.

Each hydraulic transducer may be calibrated as well. The hydraulic transducer calibration data is generated by the following steps: applying a varying load to the hydraulic transducer; generating an accurate load reference signal for measuring the varying load, computing calibration data for the hydraulic transducer utilizing the load reference signal and the hydraulic transducer output signal; and storing the hydraulic transducer calibration data on storage means associated with the hydraulic transducer. The calibration data for the hydraulic transducer is preferably generated using a calibration system which comprises: a calibration controller for the varying the load on and temperature of the hydraulic transducer, means for generating an accurate reference signal for measuring the load on the hydraulic transducer, and means for generating an accurate reference signal for measuring the varying temperature. The calibration controller preferably comprises means for computing the calibration data for the hydraulic transducer utilizing the temperature reference signal and the load reference signal, and means for storing the hydraulic transducer calibration data on means associated with the hydraulic transducer.

An improved method of performing cornering correction in a weighing system is also provided.

DESCRIPTION OF THE PREFERRED EMBODIMENT

Figure 1:
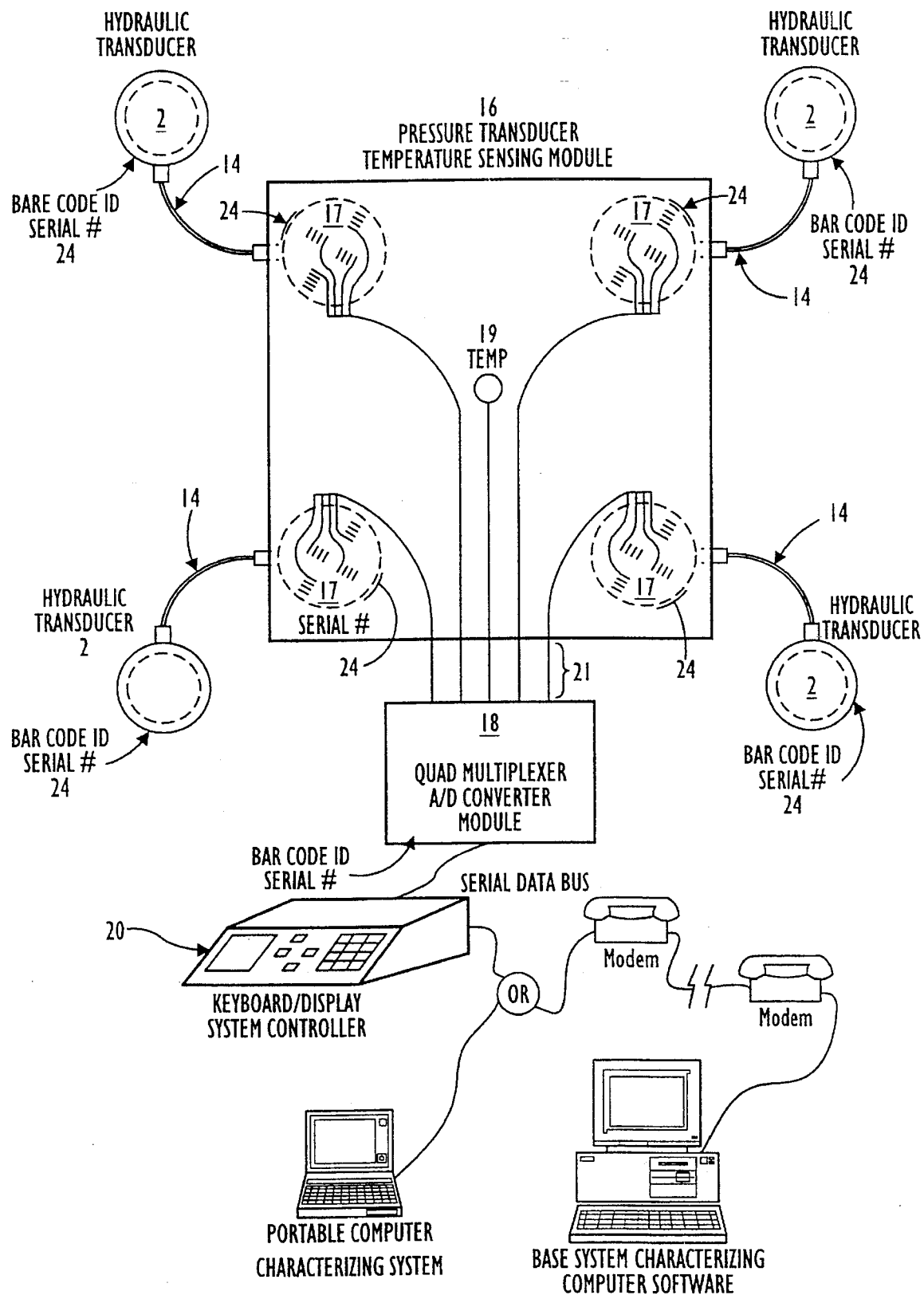
FIG. 1 is a schematic view showing the modular hydraulic weighing system of the present invention.
Figure 2:
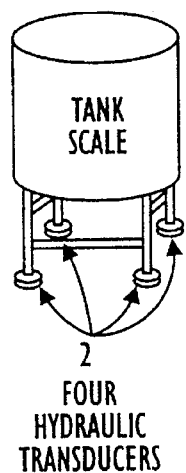
FIG. 2 is a perspective view of a typical tank scale.
Figure 3:
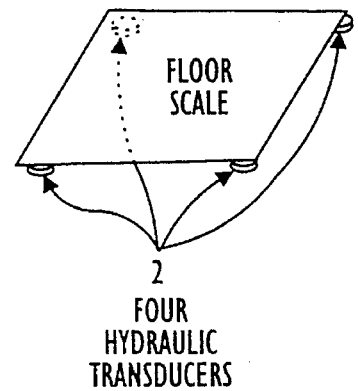
FIG. 3 is a perspective view of a typical floor scale.
Figure 4D:
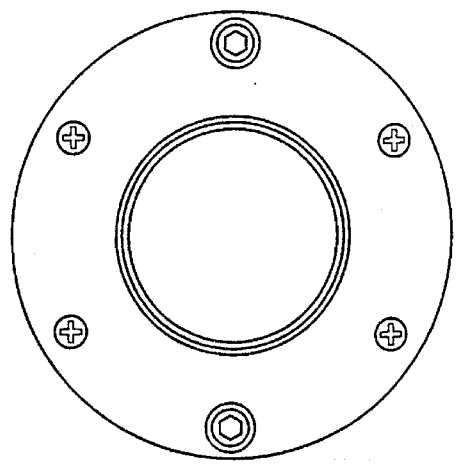
FIG. 4D is a bottom view of the hydraulic load cell shown in FIG. 4A.
Figure 4C:
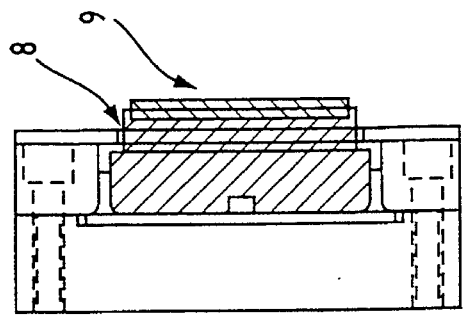
FIG. 4C is a cross-sectional side view of the hydraulic load cell shown in FIG. 4A.
Figure 4B:
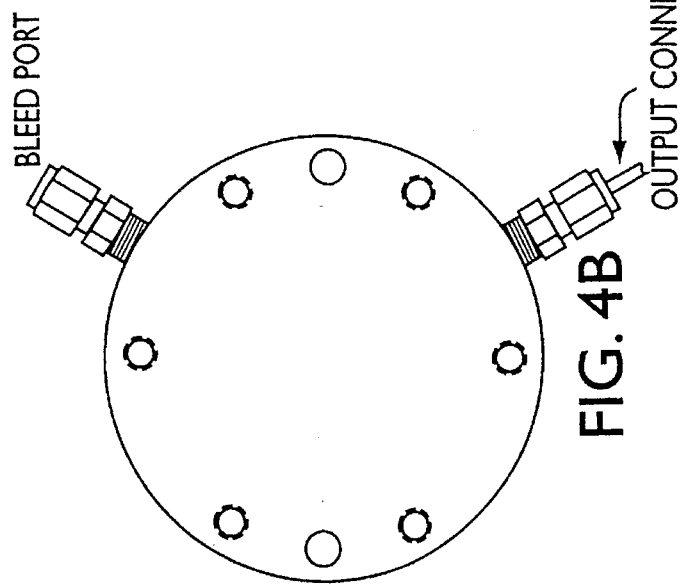
FIG. 4B is a top view of the hydraulic load cell shown in FIG. 4A.
Figure 4A:
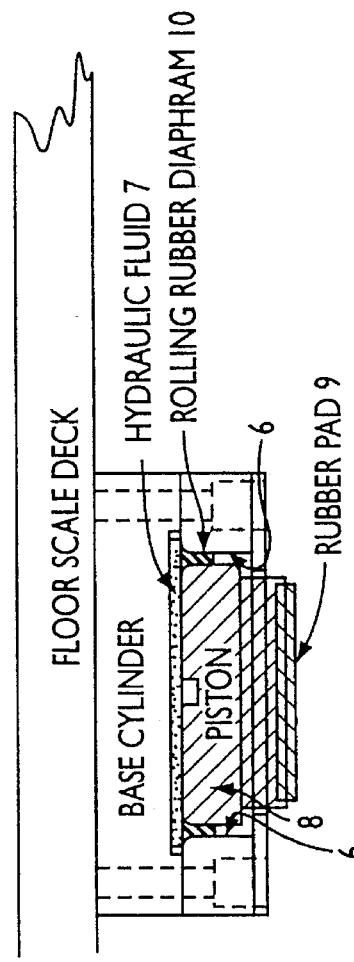
FIG. 4A is a cross-sectional view of a typical hydraulic load cell.
Figure 5:
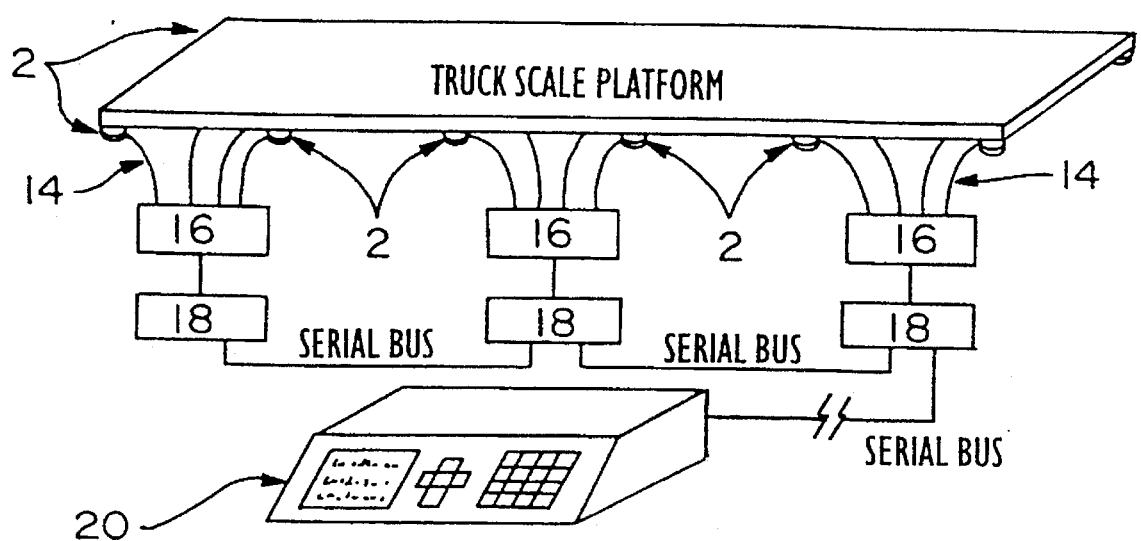
FIG. 5 is a schematic of the modular hydraulic weighing system of the present invention attached to a truck scale.

As shown in FIG. 1, the present invention is a hydraulic scale system which employs one or more hydraulic transducers 2. Hydraulic transducers 2 may be, for example, placed under the four corners of a structure, such as a tank or hopper scale, as shown in FIG. 2, or placed under the corners of a weighing platform, such as a floor scale, as shown in FIG. 3, or a truck scale, as shown in FIG. 5. "Weighing platform," as used herein, shall mean either a structure or an actual platform. Although the preferred embodiment of the invention will be described with respect to a system using four hydraulic transducers, those skilled in the art will appreciate that the invention is applicable to weighing systems using one or more hydraulic transducers.

Figure 6:
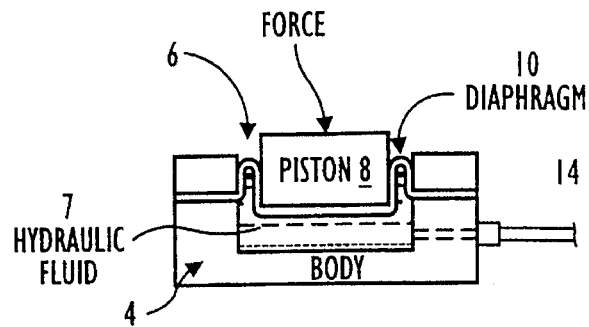
FIG. 6 is a cross-sectional view of a typical hydraulic transducer.
Figure 7B:
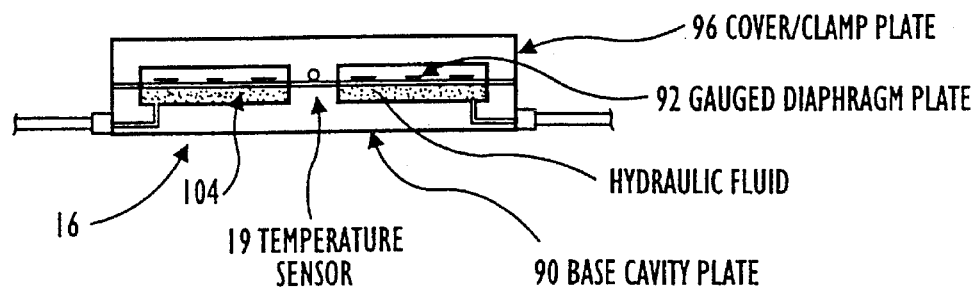
FIG. 7B is a cross-sectional side view of the pressure transducer module shown in FIG. 7A.
Figure 7A:
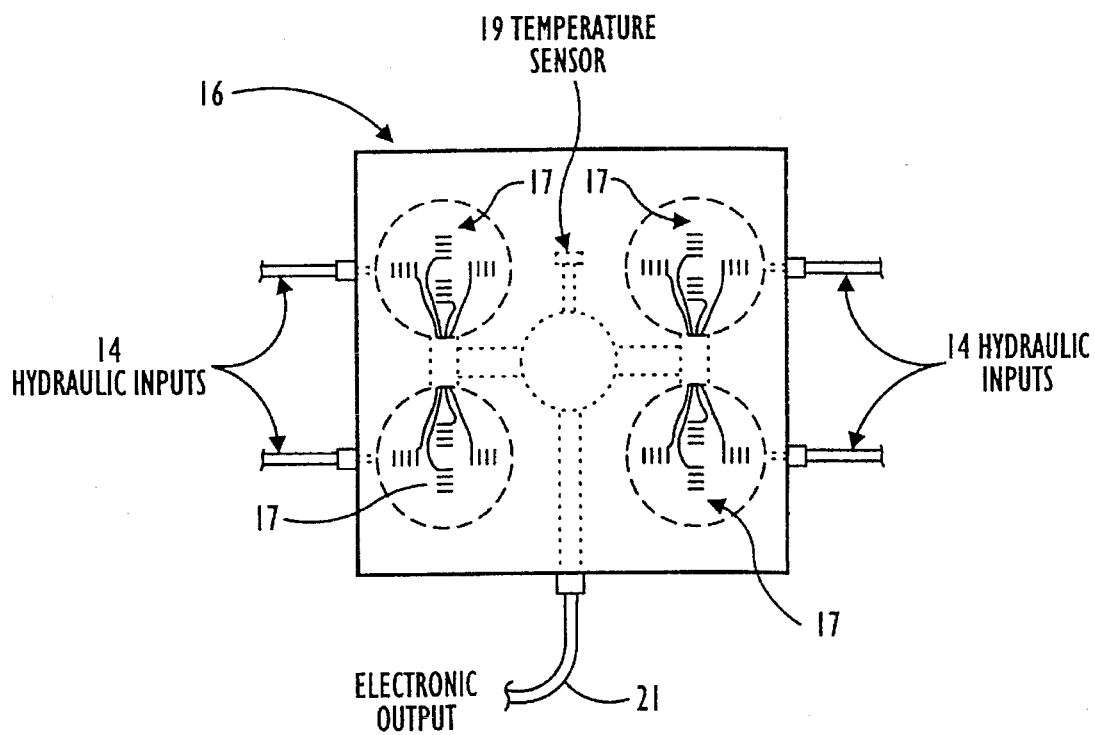
FIG. 7A is a top view of the pressure transducer module of the present invention.

FIGS. 4A–4D and 6 show embodiments of typical hydraulic transducers for use in the invention. Hydraulic transducer 2 includes a base or body 4 which is attached to the bottom of a weighing platform (FIG. 4A) or which sits on the floor below a scale platform (FIG. 6). The base 4 supports a cylindrical casing 6 having an interior volume that is filled with a hydraulic fluid 7. A piston 8, which is movable within cylinder 6, has a pad 9, preferably a rubber pad, on one end, and a sealing diaphragm 10 on the other end. A checking ring 12 may be used to protect the diaphragm 10 from side loads. As weight is applied to the weighing platform, force is applied against piston 8, which is applied to the hydraulic fluid 7 in the interior volume of the cylinder such that an increase in weight on the weighing platform causes a proportional increase in the pressure of the hydraulic fluid. The pressurized hydraulic fluid is outputted from the hydraulic transducer 2 via a conventional hydraulic line 14. The hydraulic load cells described are by way of example only, and it is foreseen that the present invention is applicable to many other hydraulic transducer designs as well.

Generally speaking, the pressure of the hydraulic fluid will vary proportionately with the area of the piston 8. The area of the piston for any given transducer having a predetermined load range is preferably scaled so that the hydraulic transducer output over the range of the transducer is in a predetermined range, typically 0–1000 psi. For example, by varying the area of the piston, it is possible to have a truck scale transducer system having an output in the range of, for example, 100–600 psi for an applied load from 4,000–24,000 lbs., and also to have a floor scale having an output in the range of 100–600 psi for an applied load from 400–2,400 lbs. It will be appreciated that, since the output of the transducer may be kept in the same range for hydraulic transducers having vastly different load ranges the present invention enables the weighing system electronics described in detail below to be used in scales of vastly different capacities.

Hydraulic transducers 2 are connected via conventional hydraulic lines 14 to a pressure transducer module 16. Pressure transducer module 16 includes hydraulic inputs 14 from the hydraulic transducers 2. Pressure transducer module 16 includes pressure transducers 17 that convert the hydraulic pressure inputs into electrical signals proportional to the pressure of the inputs. A conventional temperature sensor 19 also provides an output signal proportional to the temperature of the pressure transducer module 16.

Pressure transducer module 16 is preferably capable of measuring four or more independent pressure inputs in the range of 0–1,000 psi, although a module could be configured for any combination of two or more pressure inputs for any pressure range. As shown in FIGS. 7A–7B and 12A–12D, the pressure module utilizes a base plate 90 and a gauged diaphragm plate 92 fixedly attached thereto. The base plate 90 and gauged diaphragm plate are preferably constructed of aluminum or stainless steel. Base plate 90 (FIG. 7B) or diaphragm plate 92 (FIG. 12A) is preferably machined so as to form a plurality of cavities 104, one cavity for each hydraulic pressure input to be measured. The thickness of diaphragm plate 92 over each cavity is selected so that increasing hydraulic pressure in the cavities causes a measurable deformation in the diaphragm plate, as discussed below. Each cavity 104 is filled with hydraulic fluid and is in fluid communication with the hydraulic inputs 14. Base plate 90 is preferably machined to enable the hydraulic inputs 14 and bleed screws 94 to be inserted therein. A cover/clamp plate 96 may be placed over the module to add structural integrity and to protect the strain gauges. Four or more strain gauges are preferably bonded on the diaphragm plate over each cavity such that increasing pressure in each cavity causes the diaphragm plate to "dome", which causes two strain gauges bonded on the diaphragm plate to be in compression and two to be in tension. The four gauges are connected to form a conventional Wheatstone bridge which, when excited with an electrical voltage, gives a low level analog voltage output proportional to the pressure in the cavity. It is foreseen that i) any other type of transducer, i.e., piezoelectric transducers, may replace the strain gauges provided that such transducers could perform the functions described herein, and ii) any other type of pressure transducer can be used to convert the hydraulic pressure from pressure transducers 2 to an electrical signal. An overview of a number of other such types of pressure transducers is provided in "Handbook of Transducers for Electronic Measuring Systems—Chapter 10," H. Norton, Prentice Hall, Inc. (1969).

Temperature sensor 19 preferably provides an analog output proportional to the average temperature of the pressure transducers. In the alternative, temperature transducer 19 may be a conventional digital temperature sensor.

As shown in FIGS. 1 and 7A–7B, and 12A–12D, multiple pressure sensors 17, preferably four, are contained in each pressure transducer module 16. It is foreseen that modules with other a fewer number or a greater number of pressure transducers may be used.

The output of pressure transducer module 16, which consists of four analog pressure outputs 21 and an analog or digital temperature output, is connected, via electrical cable, to a quad-multiplexed converter module 18. Quad-multiplexed convertor module 18 converts the analog outputs of the pressure transducer module 16 into digital signals via a multiplexed A/D converter. The output of quad-multiplexed convertor module 18 preferably consists of a digital serial data stream comprising the temperature of the pressure transducer module 16 and the force applied to each hydraulic transducer 2.

Figure 8:
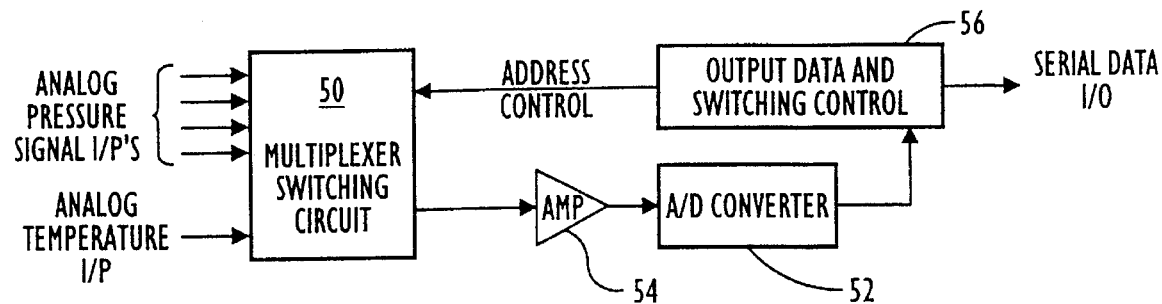
FIG. 8 is a schematic view of the A/D conversion and multiplexor circuit of the present invention.

As shown in FIG. 8, quad-multiplexed convertor module 18 preferably employs an input multiplexor 50 to sequentially switch the analog pressure and temperature signals from the hydraulic transducers 2 into the input of an analog-to-digital (A/D) converter circuit 52 via an optional amplifier 54. The switching selection is controlled by a switching control circuit 56, which also controls the data input/output communication to the keyboard/display system controller (discussed below), insuring correlation between the input selection and the digital data output.

The quad-multiplexed convertor module 18 can utilize any type of input switches appropriate for the output level of the pressure and temperature sensors, and any A/D converter with the resolution required for the desired overall system accuracy. A simple microprocessor or sequencing circuit may be used to control the output of data and switching between inputs. It will be appreciated that, if the particular type of pressure transducer in use generates a digital output, then it will not be necessary to employ an A/D convertor.

In a preferred embodiment, the quad-multiplexed convertor module 18 is preferably integrated with the pressure transducer module 16 in an environmentally sealed housing, resulting in a cost effective, temperature compensated, multiple input pressure transducer module with a serial digital output.

The output of the quad-multiplexed convertor module 18 is connected, via a serial data bus, to a keyboard/display system controller 20. The keyboard/display system controller 20 stores calibration data, which has been downloaded from a PC or other external source, for each of the hydraulic transducers 2 and the pressure transducer module 16 and uses this compensation data to digitally compensate for errors in the transducers to obtain an overall system accuracy within commercial weighing tolerances over a wide range of environmental conditions despite the use of system components that may have an accuracy lower that the commercial weighing tolerances.

Alternatively, a microprocessor may be incorporated into pressure transducer module 16 along with an A/D convertor, and a multiplexor (these may be incorporated into the microprocessor). The calibration data for the pressure module may then be down-loaded from a calibration controller (described in detail below) into a conventional computer memory, preferably an EEPROM, in the pressure transducer module 16, which may be accessed by the microprocessor. In this embodiment, the microprocessor performs digital compensation on the outputs of the pressure transducers within the module itself, and generates a module output representative of the error-compensated pressures from the pressure transducers. Thus, each pressure transducer module may be shipped factory calibrated so that, assuming that the hydraulic transducers are within their proper specifications, only compensation for overall system errors, i.e., cornering, need be performed by keyboard/display system controller 20.

For a system which incorporates two hydraulic transducers 2, a dual pressure transducer module 16 and a dual multiplexor A/D converter 18 could be utilized to reduce costs. Likewise, on larger scales, such as truck scales and railroad scales, up to 32 hydraulic transducers using 8 quad-pressure transducer modules 16 and 8 quad-multiplexed convertor modules 18 could be connected by serial bus to a single keyboard/display system controller 20.

Figure 9:
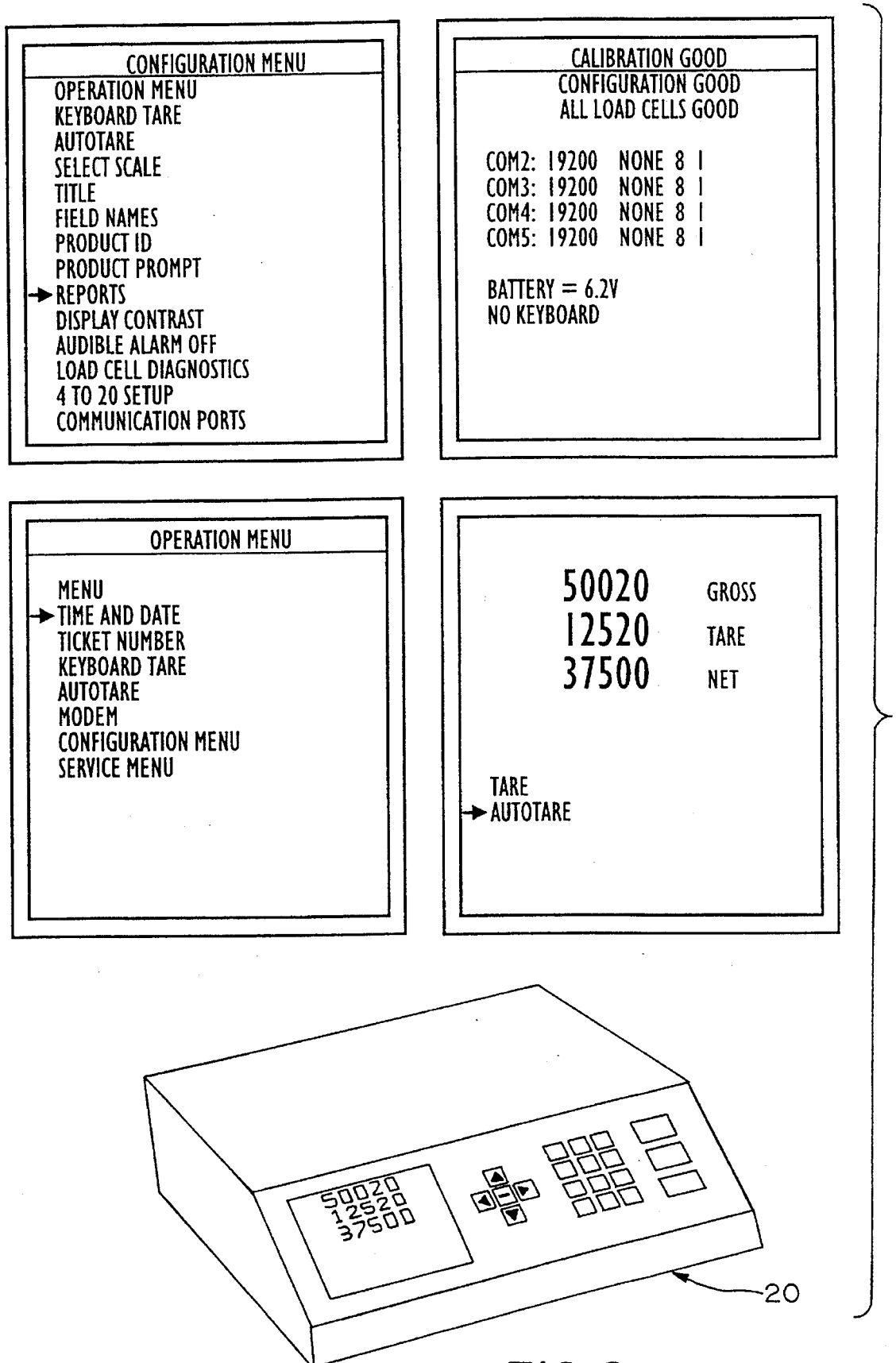
FIG. 9 is a perspective view and screen displays of the keyboard/display system controller.

As shown in FIG. 9, keyboard/display system controller 20 includes a terminal for operator interface with an alphanumeric display for operator prompting, arrow keys for access through the system menus related to operation, service, calibration and other functions, and data entry/function keys for operational control and manual entry of compensation and calibration data. The keyboard/display system controller 20 also includes a flexible I/O capability to communicate with external devices, such as a bar code scanner, printer, display, modem, computer, and 16 or more dual or quad multiplexor controller modules 18. Keyboard/display system controller 20 is preferably controlled by a conventional microprocessor, and includes memory, e.g. RAM, EPROM, flash memory, EEPROM or non-volatile or battery-backed RAM, to store compensation and calibration data.

The keyboard/display system controller can store calibration and compensation data for individual elements of the system, i.e., hydraulic transducers 2 and pressure transducer modules 16, as well as for the overall scale system.

Each hydraulic transducer 2 and each pressure transducer 17 is preferably pre-calibrated and has an associated calibration data file that is loaded into the memory of keyboard/display system controller 20. As keyboard/display system controller 20 receives the serial data stream containing the pressure readings the hydraulic transducers 2 and the pressure transducers 17, it accesses the associated calibration file for each hydraulic/pressure transducer. The calibration file for the selected transducer preferably contains information for keyboard/display system controller 20 to determine an error corrected reading of the load applied to the selected hydraulic transducer 2.

In a preferred embodiment, when each hydraulic transducer and pressure transducer is calibrated, a bar code label 24 is attached to the transducer. Bar code label 24 preferably includes coded calibration data for each hydraulic/pressure transducer 2 and 17, or a serial number to reference the calibration data to be downloaded from a computer or other external source. At the time each hydraulic/pressure transducer 2 and 17 is installed in the weighing system, a bar code scanner is preferably used to scan the bar code label 24 and retrieve the calibration data for the hydraulic/pressure transducer into EEPROM 22. Bar code label 24 and the bar code scanner are preferably of the types conventionally known in the art.

Once all of the hydraulic/pressure transducers have been installed in the system, the bar code scanner may be disconnected, if desired. Rather than utilizing bar code labels to store the calibration data, the data may simply be stored on a computer or downloaded by any conventionally known means. If it is desired to enter other error correction data for a hydraulic/pressure transducer 2 or 17 that was not pre-calibrated or that otherwise requires manual entry, this error correction data may be entered via the keyboard. If desired, each hydraulic/pressure transducer 2 and 17 may include an identification symbol, e.g. a manufacturer's Serial No., to associate that hydraulic/pressure transducer with its calibration file.

Each hydraulic transducer 2 may be provided with an integral temperature sensing element which provides a temperature reference signal for calibration and to provide temperature compensation while in service. The temperature sensor is preferably integral with the hydraulic transducer and measures the absolute temperature of the hydraulic transducer. In this way, the calibration data generated during manufacture of the hydraulic transducer will preferably include calibration and compensation for temperature induced errors. Once installed in the weighing system, the hydraulic transducer temperature sensor, in conjunction with the calibrations data, will allow compensation for temperature change.

A hydraulic/pressure transducer calibration and compensation system is provided for generating calibration and compensation data for the hydraulic and pressure transducer. Generally speaking, hydraulic transducers 2 may be manufactured with sufficiently small tolerances such that once a hydraulic transducer has been calibrated, that calibration data may be used for all hydraulic transducers of the same design and manufacture. Nonetheless, it is foreseen that each hydraulic transducer may be individually calibrated using the technique described below, if desired.

Figure 11:
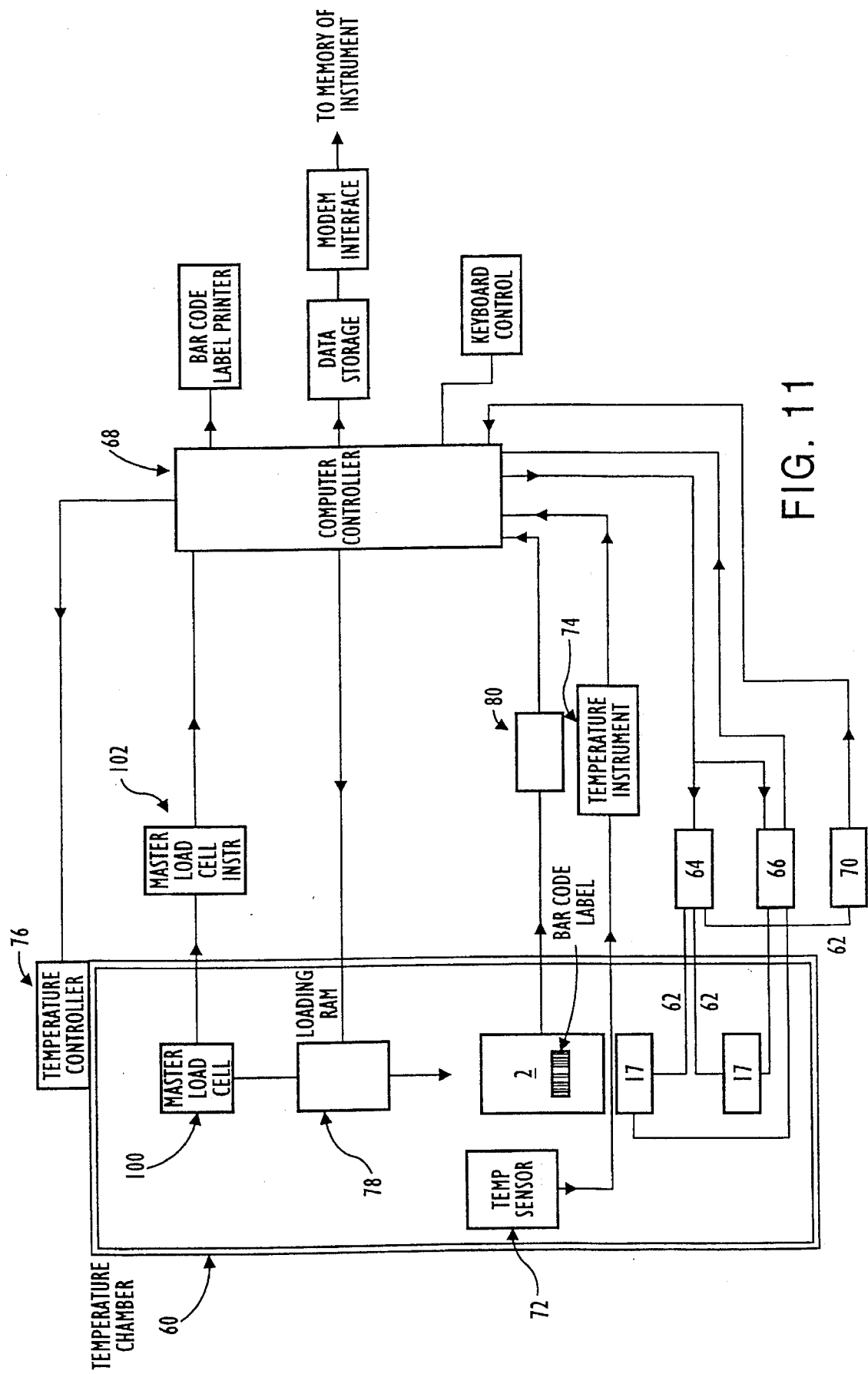
FIG. 11 is a block diagram of the present system for calibrating the pressure transducer module and hydraulic transducers.
Figure 12A:
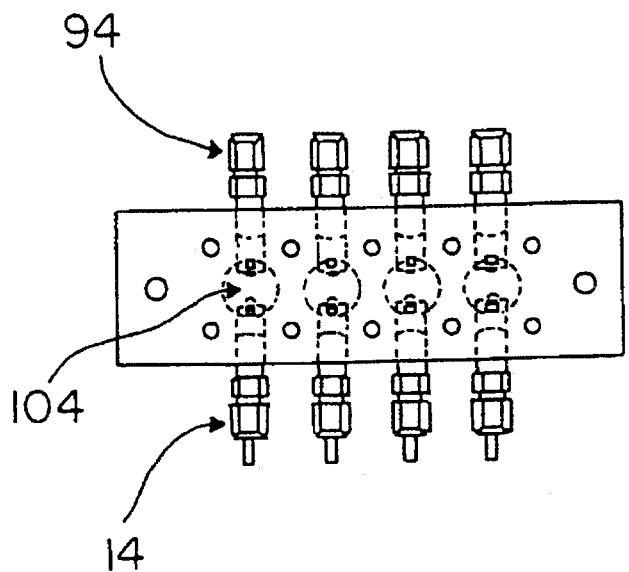
FIG. 12A is a top view of the pressure transducer module of the present invention.
Figure 12C:
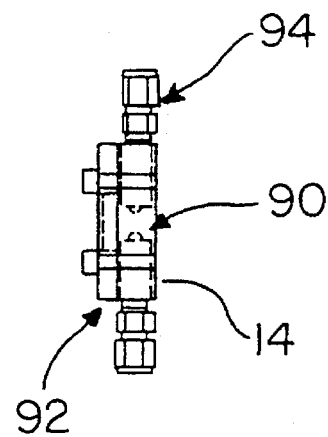
FIG. 12C is an end view of the pressure transducer module shown in FIG. 12A.
Figure 12B:
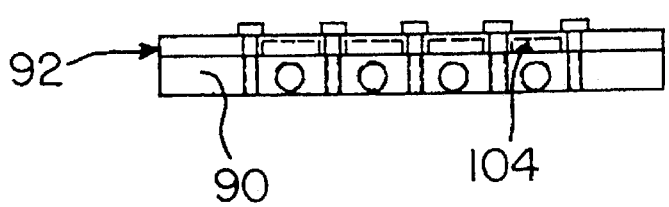
FIG. 12B is a side view of the pressure transducer module shown in FIG. 12A.
Figure 12D:
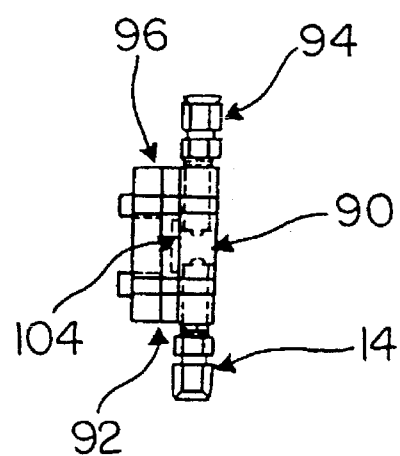
FIG. 12D is an end view of the pressure transducer module shown in FIG. 12A with a cover/clamping plate installed.

With respect to pressure transducers 17, it is preferred to generate calibration data for each transducer prior to its use. To generate such calibration data a calibration system, such as that shown in FIG. 11, is used. The calibration system is preferably capable of substantially simultaneously calibrating a plurality of pressure transducers, and may also be used to calibrate hydraulic sensors. Alternatively, separate calibration systems may be used for calibrating hydraulic transducers and pressure transducers. The pressure transducer 17 to be calibrated is preferably placed in a temperature chamber 60 which allows the temperature around the transducer to be varied during calibration. Each pressure transducer 17 is then attached to a hydraulic line 62, at which time the line is bled to purge any residual air from the line. Each hydraulic line 62 is then pressurized at several predetermined pressures by any conventionally known source of pressure 64, and pressure readings are taken from the output each pressure transducer by means of a multiplexed A/D convertor 66. A/D convertor 66 and pressure source 64 are controlled by a computer controller 68, which also receives the pressure outputs from the pressure transducers 17.

In order to calibrate the pressure transducer over its intended load range, the pressurizing means 64, which is computer controlled, applies varying pressure to the hydraulic fluid in each hydraulic line 62. This force is preferably measured by a master pressure transducer 70, which generates an accurate reference signal of the pressure on each pressure transducer.

The calibration chamber preferably includes a temperature controller 76 for varying the temperature in the chamber responsive to a signal from computer controller 68. This allows each pressure transducer to be calibrated for variations in both pressure and temperature. In order to measure the temperature of the pressure transducers during testing, a conventional temperature reading instrument 74 is provided for reading the output of temperature sensor 72 in the temperature chamber and for converting it to digital form to be read by the computer controller 68. Alternatively, a digital temperature sensor may communicate directly with computer controller 68.

Computer controller 68 generates signals to apply varying pressures to the pressure transducers 17 while varying the temperature of the pressure transducers. As this is done, the computer controller reads the hydraulic transducer temperature and pressure outputs, and compares these to the outputs of the master pressure transducer and the temperature controller outputs. Using this information, the computer controller generates digital calibration and compensation data for each pressure transducer.

In addition, at various fixed pressures, the system measures changes in the output of the pressure transducer over time to determine creep characteristics for the transducer. In a preferred embodiment, each pressure transducer is tested at three different pressures, a low pressure, for example, 100 psi, a medium pressure, for example, 400 psi, and a high pressure, for example, 700 psi, and at three different temperatures, preferably −10 Celsius, +20 Celsius, and +40 Celsius. In addition, the creep characteristics are measured at a stable pressure over a fixed time period, and the hysteresis characteristics of the transducer are measured by increasing and then decreasing the pressure in steps over the working pressure range, and measuring the difference between the values for increasing pressures versus those for decreasing pressures.

As previously discussed, each pressure transducer preferably includes a bar code label which is attached to the transducer. When the calibration and compensation data has been compiled for a particular pressure transducer, this data is stored in computer memory against the bar code label number for the transducer. If desired, a separate calibration data storage means may be provided to load the pressure transducer calibration data onto a separate storage device, i.e. a disk, a PROM, or other storage device. For example, the calibration data may be stored on a disk.

If the hydraulic transducers are to be calibrated, the calibration system preferably includes a loading ram 78 or other means to apply a force equivalent to weight on the hydraulic transducer 2 for calibration. The hydraulic transducer 2 and ram 14 are preferably placed in a temperature chamber 60 such as that described above. The system may calibrate more than one hydraulic transducer at a time by multiplexing the hydraulic transducer outputs to controller 68.

To measure the output of hydraulic transducer 2, hydraulic transducer reading instrument 80 is connected to hydraulic transducer 2 via a hydraulic line. Hydraulic transducer reading instrument 80 may be any type of highly accurate pressure transducer, and preferably includes an A/D convertor for converting the pressure transducer output into digital form for computer controller 68. In order to measure the temperature of the hydraulic transducer 2, a conventional temperature reading instrument 72 may be used, as discussed above.

In order to calibrate the hydraulic transducer 2 over its intended load range, loading ram 78, which is preferably a hydraulic device in which the pressure in the ram is controlled by computer controller 18, applies a force, for example 1000 lbs, 2000 lbs, 3000 lbs, 4000 lbs, etc. to hydraulic transducer 2. The pressure output of the hydraulic transducer is accurately measured by the pressure reading instrument at various pressures so as to either verify the accuracy of the hydraulic transducer, or to generate a look up table relating the force applied to the hydraulic transducer to the hydraulic transducer output. As previously mentioned, once calibration data is generated for a hydraulic transducer, much of the data will generally be applicable to all hydraulic transducers of the same design.

Computer controller 68 preferably generates signals to apply varying loads to hydraulic transducer 2 while varying the temperature of the hydraulic transducer. As this is done, computer controller 68 reads the hydraulic transducer pressure output and the output of a highly accurate master reference load cell 100 via a master load cell reading instrument 102. Using this information, the computer controller 68 generates digital calibration and compensation data for the hydraulic transducer 2.

If desired, other methods of storing and retrieving the calibration data may be used. For example, if hydraulic transducer data storage device 28 is used to magnetically store the hydraulic transducer calibration data on a disk, this information may then be transmitted by a modem 30, or other interface device directly to the memory of the instrument in which the hydraulic transducer is eventually installed.

The compensation and calibration data for each individual pressure transducer 17 or hydraulic transducer 2 can be conveyed to the site of a weighing system by any of the following methods:

1. A telephone modem link which transmits data from a manufacturing database to the instrument memory at the scale location.
2. High density bar code label on the pressure/hydraulic transducer which is read into instrument memory at scale location.
3. Portable data storage device such as a portable computer, EEPROM, floppy disc, tape, etc. which can be transported to the scale site and data loaded into instrument memory.
4. Keyboard manual data entry at scale site from information supplied with pressure transducer.

The compensation and calibration data which is computed during the calibration phase for the pressure transducer and/or the hydraulic transducer preferably includes:

a. A temperature correction table for the hydraulic transducer for zero drift. Correction preferably occurs by adding or subtracting counts to the digital read out of the pressure transducer.
b. Correction table for ambient temperatures for span or output.
c. Linearity correction table.
d. Creep correction table which adds or subtracts digital counts as a function of pressure, ambient temperature and time.
e. Hysteresis correction.

Once each pressure/hydraulic transducer is calibrated, it generally requires no additional calibration for errors. As discussed above, hydraulic transducers may be designed such that the outputs of transducers having vastly different load ranges may be kept in the same range. Accordingly, the aforementioned pressure sensing modules may be used in a variety of different scales ranging from floor scales to truck scales, without modification. Moreover, the present system allows highly accurate weighing systems to be developed using much less expensive pressure transducers once these pressure transducers are pre-calibrated using the above-described method. Once the calibration data has been loaded, the system will provide a highly accurate reading of the pressure transducer output, without additional calibration or error correction, except that compensation due to the mechanical properties of the weighing system may be made at the installation site.

Figure 10:
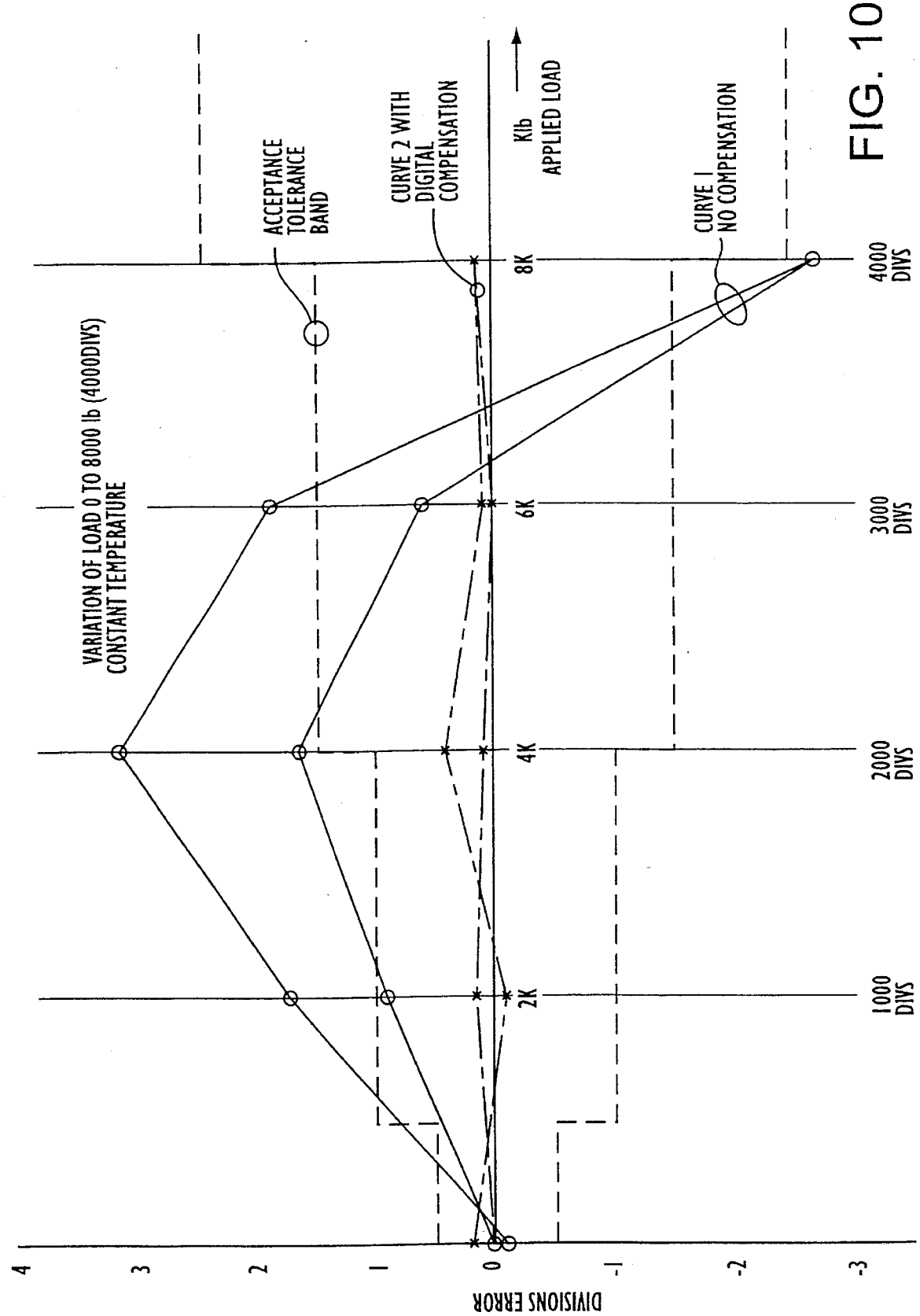
FIG. 10 is a graph showing the improved performance of a hydraulic weighing system which includes the pre-calibrated pressure transducer module of the present invention.

By way of example, the present system can compensate for large errors due to non-linearity and hysteresis. In the scale industry, an accuracy of 0.02% or greater is required. As shown in FIG. 10, testing was performed initially with an uncompensated pressure transducer module. The graphed results show that, uncompensated, the module failed to provide the system accuracy required to fall within the acceptable tolerance band. Once compensated, the system accuracy was well within the necessary tolerance band.

The present system also affords means for diagnostic testing of pressure transducers installed in a pressure transducer module, or hydraulic transducers. Since certain characteristics of the pressure/hydraulic transducers are stored in the system memory, diagnostic testing may be done by comparing actual readings from the transducers, either loaded or unloaded, with the predicted values. If the discrepancy exceeds a threshold, system maintenance is necessary. Alternatively, the system can be programmed to self-adjust to compensate for the errors.

If desired, the present system may be used to effectuate digital cornering of a scale incorporating multiple hydraulic transducers. In order to accomplish this, a known weight is applied over each of the hydraulic transducers on the scale, and an error (span) correction factor is determined. The span factor for each transducer is then entered into the system's memory at the time the hydraulic transducer is installed in a scale to balance the output reading of each hydraulic transducer to a common value, so that weight will read out same value on all sections of the scale.

In order to apply the known weight to each of the hydraulic transducers on the scale, automated means, i.e., a robot may be provided which automatically moves from one hydraulic transducer to the next on the scale and applies the known weight. The automated means then reads each hydraulic transducer output and computes a span factor for that hydraulic transducer.

Although the present invention has been described in detail with respect to certain embodiments and examples, variations and modifications exist which are within the scope of the present invention as defined in the following claims.

What is claimed is:

1. A pressure transducer module which comprises:

a base plate comprising a plurality of cavities, each cavity filled with hydraulic fluid and in fluid communication with an associated source of pressurized hydraulic fluid;

at least one diaphragm plate covering the cavities, the diaphragm plate covering each cavity deforming generally proportionately to variations in the pressure of the hydraulic fluid in the cavity; and a sensor associated with each cavity for generating an output signal representative of the deformation of the diaphragm plate covering such cavity.

2. The pressure transducer module according to claim 1:

a wherein the diaphragm plate is fixedly attached to the base plate, the cavities being positioned between the base plate and diaphragm plate, each sensor located adjacent to its associated cavity on the other side of the diaphragm plate from the cavity.

3. The pressure transducer module according to claim 1 wherein each sensor comprises a strain gauge arranged in a wheatstone bridge.

4. The pressure transducer module according to claim 2 wherein each sensor comprises a strain gauge arranged in a wheatstone bridge.

5. The pressure transducer module according to claim 1 further comprising means for multiplexing the output signals from the sensors, and means for converting the output signals from the sensors to digital form, whereby the pressure transducer module generates a digital output signal comprising the outputs of the sensors.

6. The pressure transducer module according to claim 1 wherein the output signal from the sensors are digital, and further comprising means for multiplexing the output signals from the sensors, whereby the pressure transducer module generates a digital output signal comprising the outputs of the sensors.

7. The pressure transducer module according to claim 1 further comprising an input connection for connecting each cavity to the associated source of pressurized hydraulic fluid, and a bleed connection in fluid communication with each cavity.

8. The pressure transducer module according to claim 1 wherein the pressure transducer module is pre-calibrated, and further comprising calibration data storage means for storing pre-calibration data for each sensor and cavity.

9. The pressure transducer module according to claim 1 wherein the pressure transducer module is pre-calibrated, and further comprising calibration data storage means for storing pre-calibration data for each sensor, means for multiplexing the output signals from the sensors, means for converting the output signals from the sensors to digital form, and a controller for receiving the digitized sensor outputs and for applying the calibration data to the outputs of the sensors to calculate the pressure of the hydraulic fluid input to the cavity associated with that sensor.

10. The pressure transducer module according to claim 1 wherein the pressure transducer module is pre-calibrated and wherein the output signal from the sensors are digital, the pressure transducer module further comprising calibration data storage means for storing pre-calibration data for each sensor, means for multiplexing the output signals from the sensors, and a controller for receiving the multiplexed sensor outputs and for applying the calibration data to the outputs of the sensors to calculate the pressure of the hydraulic fluid input to the cavity associated with that sensor.

11. The pressure transducer module according to claim 8 wherein the pre-calibration data comprises creep, hysteresis, non-linearity and temperature properties for the pressure transducer module.

12. The pressure transducer module according to claim 1 further comprising a temperature sensor for measuring the average temperature of the transducer module.

13. The pressure transducer module according to claim 8 further comprising a temperature sensor for measuring the average temperature of the transducer module, the pre-calibration data comprising temperature properties for the pressure transducer module.

14. A weighing system which comprises:

a weighing platform or structure;

a pressure transducer module in accordance with claim 1; and a plurality of hydraulic transducers positioned for measuring the load applied to the weighing platform or structure, each hydraulic transducer generating a hydraulic fluid output at a pressure proportional to the load applied to the hydraulic transducer, each hydraulic transducer output being connected to an associated cavity of the pressure transducer module.

15. The weighing system according to claim 14 wherein the pressure transducer module is pre-calibrated and further comprising:

means for storing calibration data for the pressure transducer module; and a controller for receiving the outputs of the sensors and for applying the calibration data to the outputs of the sensors to calculate the pressure of the hydraulic fluid input to the cavity associated with that sensor.

16. The weighing system according to claim 15 wherein the pre-calibration data comprises creep, hysteresis, non-linearity and temperature properties for the pressure transducer module.

17. The weighing system according to claim 15 wherein each hydraulic transducer fluid output has a fixed pre-determined output pressure range corresponding to the load range for that hydraulic transducer, the controller further comprising means for scaling the hydraulic fluid pressure input to each cavity against the pre-determined output pressure range of its associated hydraulic transducer for determining the load on each hydraulic transducer.

18. The weighing system according to claim 15 further comprising means for multiplexing the output signals from the sensors, and means for converting the output signals from the sensors to digital form, whereby the pressure transducer module generates a digital output signal comprising the outputs of the sensors, the controller receiving the digital output and determining the load on each hydraulic transducer.

19. The weighing system according to claim 15 wherein the output signals from the sensors are digital, and further comprising means for multiplexing the output signals from the sensors, the controller receiving the digital output and determining the load on each hydraulic transducer.

20. The weighing system according to claim 18 wherein the pressure transducer module further comprises a temperature sensor for generating a temperature signal representative of the average temperature of the transducer module, and further comprising means for converting the temperature signal to digital form, the controller receiving the digital temperature signal and determining the temperature of the pressure transducer module.

21. A weighing system which comprises:
   a plurality of the pressure transducer modules in accordance with claim 1; and
   a controller for receiving the outputs of the sensors and for determining the pressure of the hydraulic fluid in each cavity.

22. A weighing system which comprises:
   a weighing platform or structure;
   a plurality of hydraulic transducers positioned for measuring the load applied to the weighing platform or structure, each hydraulic transducer generating a hydraulic fluid output at a pressure proportional to the load applied to the hydraulic transducer;
   a pre-calibrated pressure transducer module which comprises:
   i) a base plate comprising a plurality of cavities;
   ii) at least one diaphragm plate sealingly covering the cavities, each hydraulic transducer fluid output being connected to an associated cavity of the pressure transducer module, the diaphragm plate over each cavity deforming generally proportionately to variations in the pressure of the hydraulic fluid in that cavity;
   iii) a sensor associated with each cavity for generating an output signal representative of the deformation of the diaphragm plate over that cavity, the sensor comprising strain gauges arranged in a wheatstone bridge, each sensor located adjacent to its associated cavity on the other side of the diaphragm plate from the cavity; and
   iv) a temperature sensor for generating a temperature output signal representative of the temperature of the pressure module;
   multiplexor/convertor means for multiplexing the sensor output signals and the temperature output signal into a digital data stream;
   calibration data storage means for storing pre-calibration data for the pressure transducer module; and
   a controller for receiving the digital data stream and for applying the calibration data to calculate the pressure of the hydraulic fluid in each cavity.

23. The weighing system according to claim 22 wherein each hydraulic transducer fluid output has a fixed pre-determined output pressure range corresponding to the load range for that hydraulic transducer, the controller further comprising means for scaling the hydraulic fluid pressure input to each cavity against the pre-determined output pressure range of its associated hydraulic transducer for determining the load on each hydraulic transducer.

24. The weighing system according to claim 22 wherein the sensor output signals are analog signals, and wherein the multiplexor/convertor means comprises A/D conversion means for converting the sensor output signals into digital form.

25. A modular hydraulic weighing system having a plurality of hydraulic transducers for measuring a load applied to a weighing platform or structure, each hydraulic transducer generating a hydraulic fluid output at a pressure proportional to the load applied to the hydraulic transducer, the modular hydraulic weighing system comprising:
   a pressure transducer module which comprises a plurality of pre-calibrated pressure transducers, each pre-calibrated transducer comprising input connection means to a hydraulic transducer output having a fixed pre-determined output pressure range corresponding to the load range for that hydraulic transducer, each pressure transducer generating an uncompensated output signal corresponding to the pressure of the input to the pressure transducer; and
   a controller which comprises stored calibration data for each pre-calibrated pressure transducer, means for receiving the output of each pressure transducer, means for applying the calibration data for each pressure transducer to the output of that pressure transducer to calculate the pressure of the output of that pressure transducer to calculate the transducer of the input to that pressure transducer, means for inputting the load range of each hydraulic transducer, and means for determining the load on each hydraulic transducer by scaling the pressure input to each pressure transducer against the load range of its associated hydraulic transducer;
   whereby the pressure transducer module and controller may be used with hydraulic transducers having different load ranges.

26. A modular hydraulic weighing system according to claim 25 wherein the pressure transducer module further comprises a temperature sensor, and wherein the stored calibration data comprises temperature-related compensation data, the controller further comprising means for receiving the output of the temperature sensor.

27. A weighing system which comprises:
   a weighing platform or structure;
   a plurality of hydraulic transducers positioned relative to the platform or structure for measuring a load applied to the platform or structure, each hydraulic transducer generating a hydraulic fluid output at a pressure proportional to the load applied to the hydraulic transducer;

a pressure transducer module which comprises a plurality of pre-calibrated pressure transducers, the pressure transducer module comprising i) a base plate comprising a plurality of cavities, each cavity in fluid communication with the hydraulic fluid output of an associated hydraulic transducer, ii) at least one diaphragm plate covering the cavities, the diaphragm plate deforming generally proportionately to variations in the pressure of the hydraulic fluid in the cavities, and iii) a sensor associated with each cavity for generating an uncompensated output signal corresponding to the pressure of the output of the hydraulic transducer associated with such cavity; and a controller which comprises stored calibration data for each sensor, means for receiving the output of each sensor, and means for applying the calibration data for each sensor to the output of that sensor to calculate the load on the hydraulic transducer associated with that sensor.

28. The weighing system according to claim 27 wherein the pressure transducer module further comprises a temperature sensor that generates a temperature output, the stored calibration data comprising data for temperature-induced errors, the controller further comprising means for receiving the pressure sensor temperature output, and means for applying the calibration data for each sensor to calculate a temperature-corrected load on the hydraulic transducer associated with that sensor.

29. The weighing system according to claim 27 wherein each hydraulic transducer is pre-calibrated, the controller further comprising stored calibration data for each pre-calibrated hydraulic transducer, and means for applying the calibration data for each hydraulic transducer to the output of its associated sensor to calculate the load on the hydraulic transducer.

30. The weighing system according to claim 29 wherein each hydraulic transducer further comprises a temperature sensor that generates a hydraulic transducer temperature output, the stored calibration data comprising data for temperature-induced errors in the hydraulic transducers, the controller further comprising means for receiving the hydraulic transducer temperature output, and means for applying the calibration data for each hydraulic transducer to calculate a temperature-corrected load on that hydraulic transducer.

31. An improved weighing system having a plurality of hydraulic transducers for receiving an applied load, each generating a pressurized hydraulic fluid output, a pressure transducer module for receiving the pressurized hydraulic fluid outputs and for generating pressure output signals each corresponding to the pressure of the hydraulic fluid output of a hydraulic transducer, and a weighing system controller for reading the pressure output signals and for generating a load signal corresponding to the magnitude of the applied load; the improvement comprising:

the pressure transducer pressure output signals being variable according to a predetermined response characteristic relating the output signals to creep, hysteresis, non-linearity and temperature properties for the pressure transducer module;

means for storing calibration data for the pressure transducer module, the calibration data corresponding to the predetermined response characteristic;

the weighing system controller further comprising means for retrieving the calibration data and utilizing the calibration data for providing error and calibration correction to the pressure transducer module output signals for generating an error corrected load signal.

32. An improved weighing system according to claim 31 wherein the calibration data is generated by the following steps:

applying a varying pressure input to the pressure transducer module;

generating an accurate pressure reference signal for measuring the varying pressure;

computing calibration data for the pressure transducer utilizing the pressure reference signal and the pressure transducer pressure output signals; and storing the calibration data on storage means associated with the pressure transducer module.

33. An improved weighing system according to claim 32 wherein the calibration data is generated by the following further steps:

applying a varying temperature to the pressure transducer module while varying the pressure on the pressure transducer module;

generating an accurate reference signal for measuring the varying temperature; and computing the calibration data for the pressure transducer module utilizing the temperature reference signal, the pressure reference signal and the pressure transducer output signals.

34. An improved weighing system according to claim 31 further comprising:

calibration means applying a varying pressure to the pressure transducer module at a varying temperature, the calibration means comprising
  a calibration controller for the varying the pressure and temperature,
  means for generating an accurate reference signal for measuring the varying pressure, and
  means for generating an accurate reference signal for measuring the varying temperature;
  the calibration controller further comprising means for reading the pressure reference signal, the temperature reference signal and the pressure transducer output signals,
  means for computing the calibration data for the pressure transducer module utilizing the temperature reference signal, the pressure reference signal and the pressure transducer output signals, and
  means for storing the calibration data on means associated with the pressure transducer.

35. An improved weighing system according to claim 34 wherein the pressure transducer module further comprises a temperature sensor for generating the reference temperature signal, and for generating a temperature signal for the weighing system controller, the weighing system controller reading the pressure transducer output signals and the temperature signal and utilizing the calibration data for providing error and calibration correction in temperature and pressure to the pressure transducer output signals for generating an error corrected load signal.

36. An improved weighing system according to claim 31 wherein the means associated with the pressure transducer module for storing the calibration data comprises bar code label means.

37. An improved weighing system according to claim 31 wherein the means associated with the pressure transducer module for storing the calibration data comprises magnetic media.

38. An improved weighing system according to claim 31 wherein the predetermined response characteristic comprises response data for the pressure transducer module selected from the group consisting of temperature effect on zero and span drift, temperature effect over time, linearity over temperature and pressure change, creep over temperature and pressure change, hysteresis over temperature and pressure change, span, and cornering.

39. An improved weighing system according to claim 31 wherein each hydraulic transducer output signal is variable according to a predetermined response characteristic relating the hydraulic transducer output signal of the hydraulic transducer to creep, hysteresis, non-linearity and temperature properties for the hydraulic transducer;

the weighing system further comprising means for storing calibration data for each hydraulic transducer, the calibration data corresponding to the predetermined response characteristic for the hydraulic transducer; and the weighing system controller further comprising means for retrieving the hydraulic transducer calibration data and for generating an error corrected load signal.

40. An improved weighing system according to claim 39 wherein the hydraulic transducer calibration data is generated by the following steps:

applying a varying load to the hydraulic transducer;

generating an accurate load reference signal for measuring the varying load, computing calibration data for the hydraulic transducer utilizing the load reference signal and the hydraulic transducer output signal; and storing the hydraulic transducer calibration data on storage means associated with the hydraulic transducer.

41. An improved weighing system according to claim 40 wherein the hydraulic transducer calibration data is generated by the following further steps:

applying a varying temperature to the hydraulic transducer while varying the load on the hydraulic transducer;

generating an accurate reference signal for measuring the varying temperature; and computing the calibration data for the hydraulic transducer utilizing the temperature reference signal, the load reference signal and the hydraulic transducer output signal.

42. An improved weighing system according to claim 39 further comprising:

calibration means applying a varying load to the hydraulic transducer at a varying temperature, the calibration means comprising
  a calibration controller for the varying the load and temperature,
  means for generating an accurate reference signal for measuring the load on the hydraulic transducer, and
  means for generating an accurate reference signal for measuring the varying temperature;
  the calibration controller further comprising means for computing the calibration data for the hydraulic transducer utilizing the temperature reference signal and the load reference signal, and
  means for storing the hydraulic transducer calibration data on means associated with the hydraulic transducer.

43. An improved method of performing cornering error correction in a scale having a plurality of hydraulic transducers for receiving a load applied to the scale, each hydraulic transducer generating an output signal corresponding to the magnitude of the load on that hydraulic transducer, and means for reading each output signal, for converting the output signal to a digital signal and for generating a digital load signal corresponding to the magnitude of the total applied load; wherein the improvement comprises:

applying a known weight to each hydraulic transducer on the scale;

reading the output signal of each hydraulic transducer and converting the output signal to a digital output signal;

comparing the digital output signal of each hydraulic transducer to an expected digital output value corresponding to the known weight and determining a span correction factor for each hydraulic transducer, whereby each hydraulic transducer output signal may be corrected to correspond to the expected output value;

storing the span correction factor for each hydraulic transducer; and retrieving the span correction factor for each hydraulic transducer when a load is applied to the scale and applying the span correction factor for each hydraulic transducer to the digital output signal for that hydraulic transducer for providing cornering error correction to the output signals, and generating an error corrected load signal.

44. The method according to claim 43 wherein the step of applying a known weight to each hydraulic transducer comprises providing automated means having a known weight, the automated means positioning itself over each hydraulic transducer and thereby applying the known weight.

45. A system for calibrating a pressure transducer which comprises:

a calibration chamber;

means for applying a varying pressure to the pressure transducer in the calibration chamber, the pressure transducer generating an output related to the magnitude of the pressure and error factors according to a determinable response characteristic;

a calibration controller for controllably varying the pressure on the hydraulic transducer and reading the output of the pressure transducer at the varying pressure;

reference pressure measuring means for generating a pressure reference output corresponding to the magnitude of the pressure applied to the pressure transducer;

the calibration controller further comprising means for reading the pressure reference output and generating calibration data corresponding to the response characteristic; and means for storing the response characteristic data.

46. A system for calibrating a hydraulic transducer according to claim 45, further comprising:

means for applying a varying temperature to the pressure transducer in the calibration chamber, the pressure transducer response characteristic being related to temperature, the calibration controller controllably varying the temperature of the pressure transducer at varying pressures and reading the output of the pressure transducer;

reference temperature measuring means for generating a temperature reference output corresponding to the magnitude of the temperature of the pressure transducer;

the calibration controller further comprising means for reading the temperature reference output, the calibration data generated by the calibration controller including temperature compensation data.

47. A pressure transducer module for receiving a plurality of pressure signals from a plurality of hydraulic transducers and for generating output signals, the output signals being determinable from a response characteristic for the pressure transducer module, the response characteristic relating the output signal to the magnitude of the pressure and error characteristics for the pressure transducer module; the improvement comprising:

means associated with the pressure transducer module for storing calibration data for the pressure transducer module, the calibration data corresponding to the response characteristic.

48. The pressure transducer module according to claim 47 wherein the response characteristic comprises response data selected from the group consisting of temperature effect on zero and span drift, temperature effect over time, linearity over temperature and pressure change, creep over time and temperature and pressure change, hysteresis over temperature and pressure change, span, and cornering.

49. The pressure transducer according to claim 47 wherein the means associated with the pressure transducer for storing calibration data for the hydraulic transducer is selected from the group consisting of bar code labels, magnetic media, and PROM.

50. An improved hydraulic load cell that generates a hydraulic fluid output at a pressure proportional to a load applied to the hydraulic transducer, the hydraulic load cell having a housing, the improvement comprising:

a pre-calibrated pressure transducer located within the housing that generates an uncompensated output signal representative of the pressure of the hydraulic fluid output;

calibration data storage means located within the housing for storing pre-calibration data for the pressure transducer; and a controller located within the housing for receiving the output signal and for applying the calibration data to calculate the load on the hydraulic load cell.

51. An improved hydraulic load cell according to claim 50 wherein the output signal is in analog form, and further comprising an A/D convertor for converting the output signal to digital form, the controller receiving the digital output signal and applying the calibration data to calculate the load on the hydraulic load cell.

52. An improved hydraulic load cell according to claim 50 further comprising a temperature sensor located within the housing for generating a temperature output signal representative of the temperature of the pressure module.

* * * * *

UNITED STATES PATENT AND TRADEMARK OFFICE
CERTIFICATE OF CORRECTION

PATENT NO. : 5,606,516
DATED : February 25, 1997
INVENTOR(S) : Alec T. Douglas, et. al.

It is certified that error appears in the above-indentified patent and that said Letters Patent is hereby corrected as shown below:

Column 14, Lines 45-46:   Delete "output of that pressure transducer to calculate the transducer of the"

Signed and Sealed this

First Day of July, 1997

Attest:

Attesting Officer

BRUCE LEHMAN

Commissioner of Patents and Trademarks